United States Patent [19]

Luscombe

[11] Patent Number: 5,480,352
[45] Date of Patent: Jan. 2, 1996

[54] ROD CONVEYOR

[76] Inventor: Arthur Luscombe, 1075 530th Ave., Dolliver, Iowa 50531

[21] Appl. No.: 317,187

[22] Filed: Oct. 3, 1994

[51] Int. Cl.⁶ .................................................. A01F 11/00
[52] U.S. Cl. ........................ 460/114; 460/144; 198/731
[58] Field of Search ................................ 460/114, 144, 460/150, 904; 56/98; 198/731, 850, 848

[56]  References Cited

U.S. PATENT DOCUMENTS

| | | | |
|---|---|---|---|
| 4,653,632 | 3/1987 | Timmer et al. | 198/848 X |
| 4,724,909 | 2/1988 | Link | 198/850 X |
| 4,908,002 | 3/1990 | Tanis | 460/114 |
| 5,176,248 | 1/1993 | Allen et al. | 198/850 |

Primary Examiner—Terry Lee Melius
Attorney, Agent, or Firm—Herman H. Barns

[57] ABSTRACT

A rod conveyor for a harvesting machine, such as a beet or potato harvester, includes a plurality of spaced apart, substantially parallel rods having flattened ends. The rods are interconnected at their flattened ends to a pair of elongate cables by clamping brackets or U-shaped bolts. The rods are trained over sprockets and support crops thereon such as potatoes or beets for movement in a harvesting machine. The means for attaching the rods to the flexible cables permits ready removal and replacement of damaged rods.

4 Claims, 1 Drawing Sheet

ROD CONVEYOR

FIELD OF THE INVENTION

This invention relates to conveyors for agricultural implements and more particularly to a rod type conveyor for an agricultural implement.

BACKGROUND OF THE INVENTION

Various types of harvesting machines including beet type harvesters use rod or bar conveyors to convey the harvested root crop such as beets, potatoes or similar crops in the harvester implement to cleaning rolls or a bin. This type of a conveyor permits dirt and other debris to fall between the bars of the conveyor while supporting the crop thereon.

In conventional bar conveyors, adjacent bars are interconnected together at their ends. Each end of each bar is bent and connected to the adjacent end of the adjacent bar in chain like fashion. The bars are trained over sprockets which are driven in the usual manner. The manufacture of this type bar or rod conveyors is expensive, and such bar conveyors are difficult to repair. Other bar conveyors are attached endless belts which are trained over pulleys.

SUMMARY OF THE INVENTION

It is an object of this invention to provide a novel and improved bar conveyor for an agricultural implement such as a beet harvester or the like.

A specific object of this invention is to provide a novel and improved bar conveyor for agricultural implements in which the bars of the conveyor are clamped to a pair of flexible members such as cables.

The novel bar conveyor includes a plurality of having flattened apertured ends. The ends of each bar are clamped to a pair of cables and the bars are trained over sprockets. When the conveyor is driven, the upper run supports potatoes, beets or similar crops thereon while permitting dirt to fall between the bars. The conveyor moves the crop in the agricultural implement to a bin or to cleaning rollers.

DESCRIPTION OF THE PREFERRED EMBODIMENT

Figure 2:
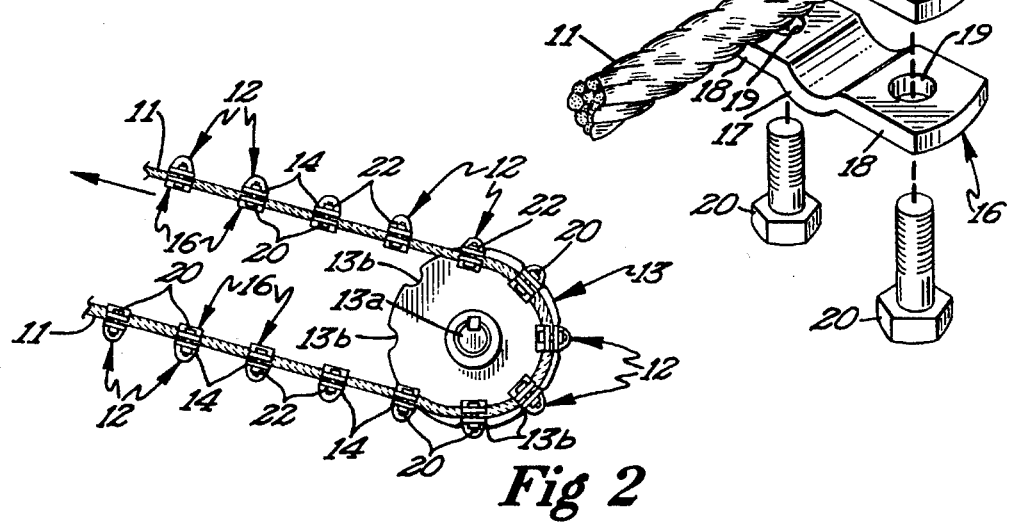
FIG. 2 is a fragmentary side elevational view of a bar conveyor.

Referring now to the drawings and more specifically to FIG. 2, it will be seen that one embodiment of the novel bar type conveyor, designated generally by the reference numeral 10 is shown mounted in a beet harvester H. The rod or bar conveyor 10 is comprised of a pair of elongate flexible cable 11 having a plurality of rods or bars 12 clamped thereto. The rod conveyor 10 is used in a beet harvester H or similar implement and is used to convey the beets or potatoes after excavation rearwardly in the implement to cleaning rolls or to a bin or truck body. The rods are trained over a pair of laterally spaced apart sprockets 13 mounted on a shaft 13a. The sprockets have recesses 13b and the outer circumference thereof for receiving the rods therein. The sprockets are positioned interiorly of the cables 11 and the sprocket illustrated in FIG. 2 is a driven sprocket. The drive sprockets, although not shown in the drawing, are identical in construction and operation to the driven sprockets 13 except that the shaft for the driven sprockets is connected to a source of power for rotating the shaft and sprockets. The arrow illustrated in FIG. 2 indicates the direction of movement of the upper run of the conveyor 10.

Figure 1:
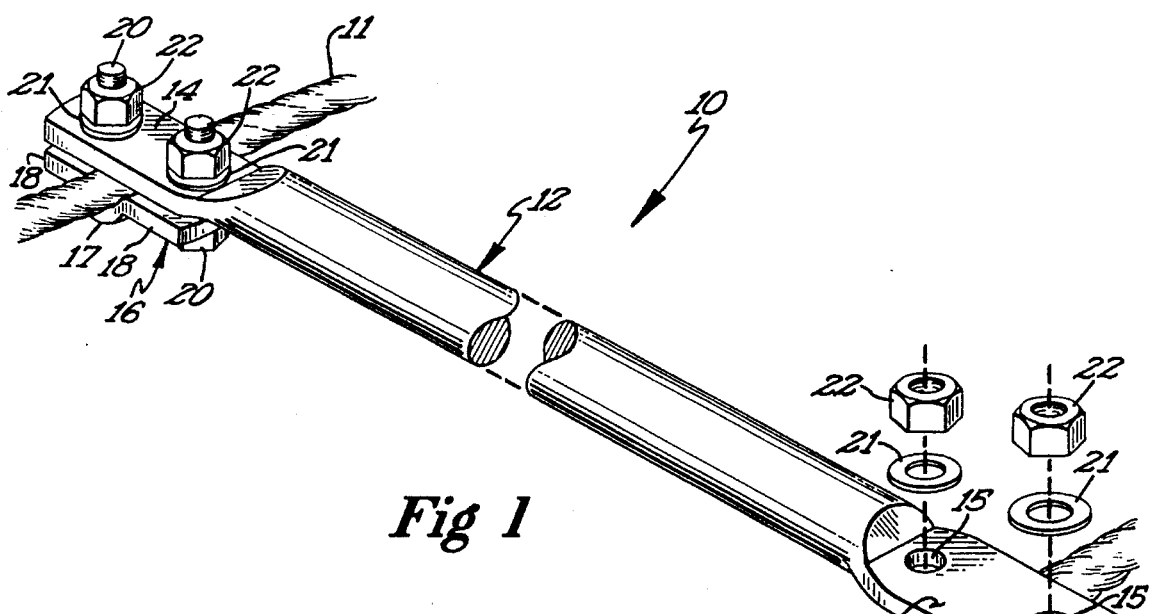
FIG. 1 is a fragmentary perspective view of a bar or rod type conveyor partially exploded and broken to illustrate the various details of construction thereon.

Referring again to FIG. 1, it will be seen that each bar or rod 12 is of circular cross sectional configuration but has flattened ends 14. Each of the flattened ends 14 is provided with a pair of longitudinally spaced apart aligned aperatures 15 therethrough. A pair of clamping brackets 16 cooperate with the ends of each rod 12 to clamp the flattened ends to the cable 11.

It will be seen that each clamping bracket 16 has a U shaped cable receiving central portion 17 integral with a pair of flat planar end portions 18. The flat planar end portions of each bracket have openings 19 therein. When each bracket 16 is placed in clamping relation with respect to a cable 11, the cable will be seated in the U shaped central portion 17 and each opening 19 will be aligned with one of the openings 15 in the flattend ends. A pair of bolt and nut assemblies are used to clamp the bracket to the rods. Each bolt assembly includes a bolt 20 which projects through the registering openings in the bracket and flattened end and is secured in place by nut 22. A suitable washer 21 is interposed between the nut and the flattened end of the rod.

This particular construction of the rod conveyor eliminates the need of shaping the ends of each rod for interlocking relation with an adjacent rod in the chain like manner of conventional rod conveyors. The manufacture of the conveyor of the instant application is therefore much cheaper than the manufacture of the conventional rod type conveyor. It is also pointed out that when a rod is broken or damaged, the rod may be readily removed by simply unloosening the bolt assemblies which clamp the bar to the cable and thereafter replacing the rod.

Figure 3:
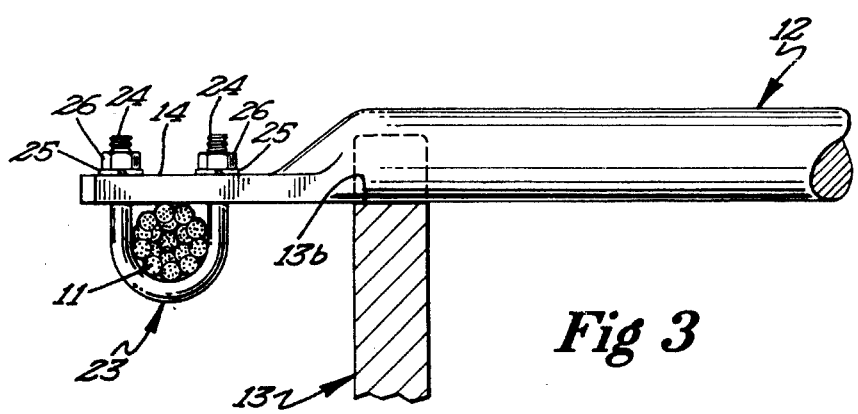
FIG. 3 is a fragmentary cross sectional view illustrating a modified form of the bar type conveyor.

Referring now to FIG. 3, a slightly modified form of the invention is thereshown. The clamping brackets 16 and the bolt assemblies have been replaced in the embodiment in FIG. 3 with the U bolt 23. The U bolt 23 has threaded ends 24 which are threadedly engaged by nuts 26, each nut bearing against a conventional washer 25. The cable 11 is directly engaged and clamped by the bight portion of a U bolt to the flattened end of a bar to secure the bars to the cables. The U bolt assemblies are of conventional construction and permit ready replacement of a damaged bar when necessary.

From the foregoing description, it will be seen that I have provided a novel and improved rod type conveyor for an agricultural implement which may be inexpensively manufactured and easily maintained.

Thus it will be seen that I have provided a novel rod type conveyor for an agricultural implement, which is not only of simple and inexpensive construction, but one which functions in a more efficient manner than any heretofore known rod conveyor.

What is claimed is:

1. A rod conveyor for a harvesting implement for conveying beets, potatoes and similar crop comprising;

plurality of substantially identical elongate rods, spaced apart laterally opposed sprocket means for engaging said rods, each rod having flattened apertured ends, means substantially connecting said rods together in spaced apart parallel relation, the spacing between adjacent rods being of a magnitude to permit dirt and debris to fall therebetween but supporting a root crops thereon including potatoes, beets and similar crops thereon;

said connecting means including a pair of endless cables, each rod having one end detachably connected to one cable and the other end detachably connected to the other cable, said cables being supported solely by said rods, and clamping means for clamping each flattened end of a rod to a cable including threaded elements and nuts engaging said threaded element, the nuts for each rod being readily disengageable from the associated threaded elements to permit removal and replacement of rods when the latter become damaged.

2. The rod conveyor as defined in claim 1 wherein said clamping means comprises a plurality of clamping brackets each comprised of a U-shaped central portion and planar apertured outer end portions, and bolt and nut assemblies for securing each clamping bracket to a flattened end of a rod to secure the rod to a cable.

3. The rod conveyor as defined in claim 1 wherein said clamping means comprises a threaded U-shaped bolt extending through a flattened end of a rod, and suitable nuts for engaging the ends of the U-shaped bolt for clamping a cable to one end of a rod.

4. A moveable rod conveyor for a harvesting implement for conveying beets, potatoes and similar crops, comprising;

plurality of substantially identical elongate transversely extending rods, laterally spaced apart opposed sprocket means for engaging said rods, each rod having flattened apertured ends;

a pair of elongate laterally spaced apart endless cables connecting said rods together in spaced apart substantially parallel relation whereby said rods and cables will be moved by said sprocket means, the spacing between adjacent rods being of a magnitude to permit dirt and debris to fall therebetween but supporting a root crops thereon including potatoes, beets and similar crops thereon;

each rod having one end detachably connected to one cable and the other end detachably connected to the other cable, said cables being positioned outwardly of said sprocket means and supported solely by said rods, and U-bolt and nut assemblies for clamping each flattened end of a rod to a cable, said U-bolt and nut assemblies being disengageable with respect to the cables to permit removal and replacement of selected bars, or adjustment of the bars relative to the cables.

* * * * *